United States Patent [19]
Gandrud

[11] 3,773,229
[45] Nov. 20, 1973

[54] GRANULAR APPLICATOR FOR LAWNS

[76] Inventor: Ebenhard S. Gandrud, P.O. Box 528, Owatonna, Minn. 55060

[22] Filed: July 29, 1971

[21] Appl. No.: 167,353

[52] U.S. Cl. .................................. 222/177, 222/233
[51] Int. Cl. .............................................. A01c 15/00
[58] Field of Search.................... 222/177, 233, 505, 222/565, 556

[56] References Cited
UNITED STATES PATENTS

| | | | |
|---|---|---|---|
| 3,534,828 | 10/1970 | Iver et al. | 181/33 K |
| 2,881,957 | 4/1959 | Hanson | 222/233 |
| 981,160 | 1/1911 | Bickerstaff | 222/177 |
| 2,323,995 | 7/1943 | Hiroshima | 222/177 |
| 2,630,945 | 3/1953 | Gandrud | 222/177 |
| 2,661,125 | 12/1953 | Gandrud | 222/177 |
| 2,684,185 | 7/1954 | Mylor | 222/177 |
| 2,737,317 | 3/1956 | Gustison | 222/177 |
| 2,778,535 | 1/1957 | Seltzer | 222/177 X |
| 2,828,051 | 3/1958 | De Paydt et al. | 222/177 X |
| 2,846,125 | 8/1958 | Gandrud | 222/177 X |
| 3,098,588 | 7/1963 | Ryan | 222/177 |

*Primary Examiner*—Robert S. Ward, Jr.
*Attorney*—Merchant & Gould

[57] ABSTRACT

An applicator for spreading granular chemicals, such as pesticides and fertilizer or seed over the ground, comprising a hopper having a cross-sectionally arcuate bottom member the bottom member having discharge apertures therein, and an elongated shaft means equipped feeding rotor journaled in the bottom portion of the hopper parallel to the arcuate bottom. A pair of supporting wheels are mounted on the shaft means for imparting rotation to the rotor responsive to movement of the applicator over the ground. Rotor driven agitator means are disposed within the hopper, and a combination spreader and closure plate is mounted exterior of the hopper for movements toward and away from the discharge apertures. A shank projecting laterally from the hopper provides means whereby the applicator is moved over the ground, and an actuator is disposed to impart movements to the spreader and closure plate.

11 Claims, 11 Drawing Figures

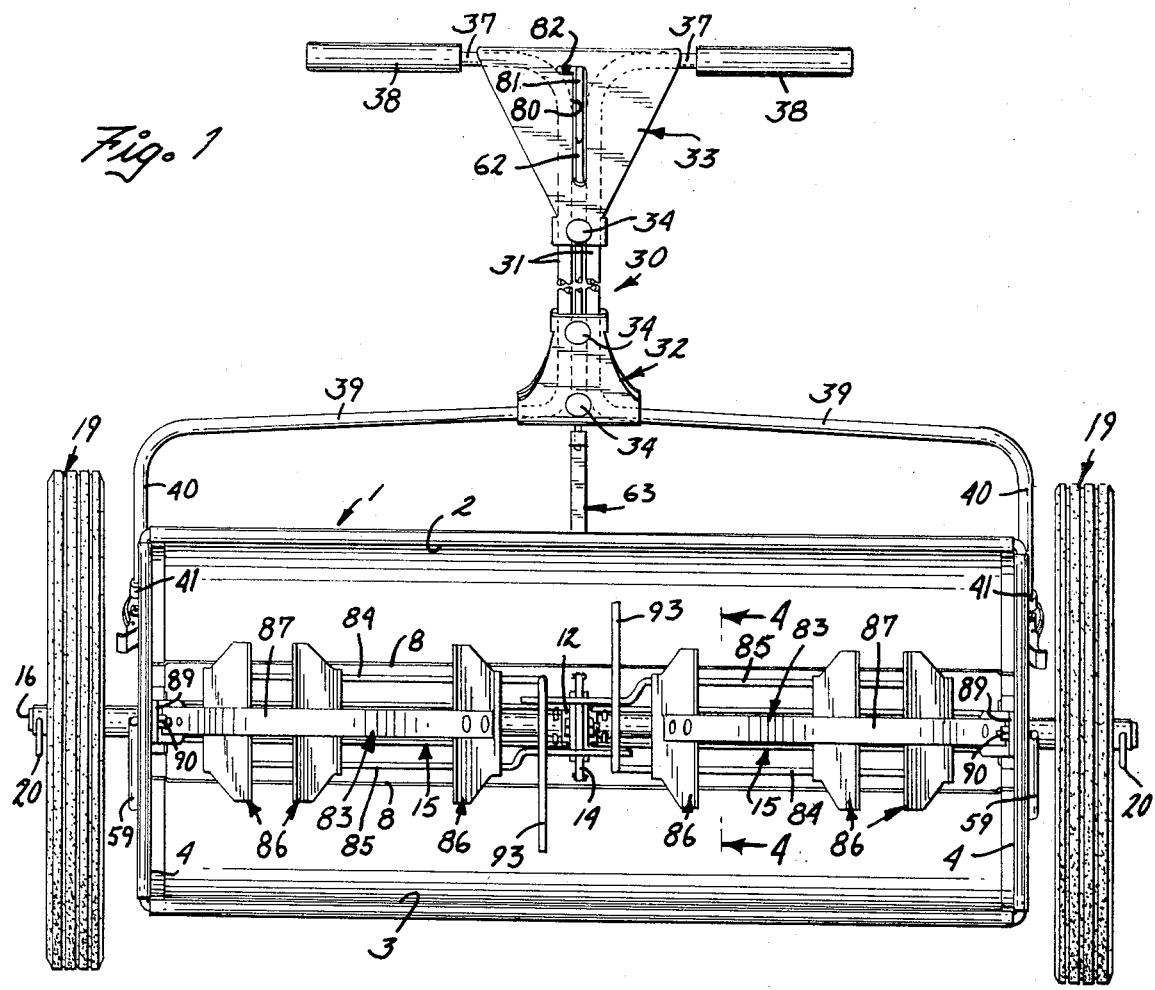

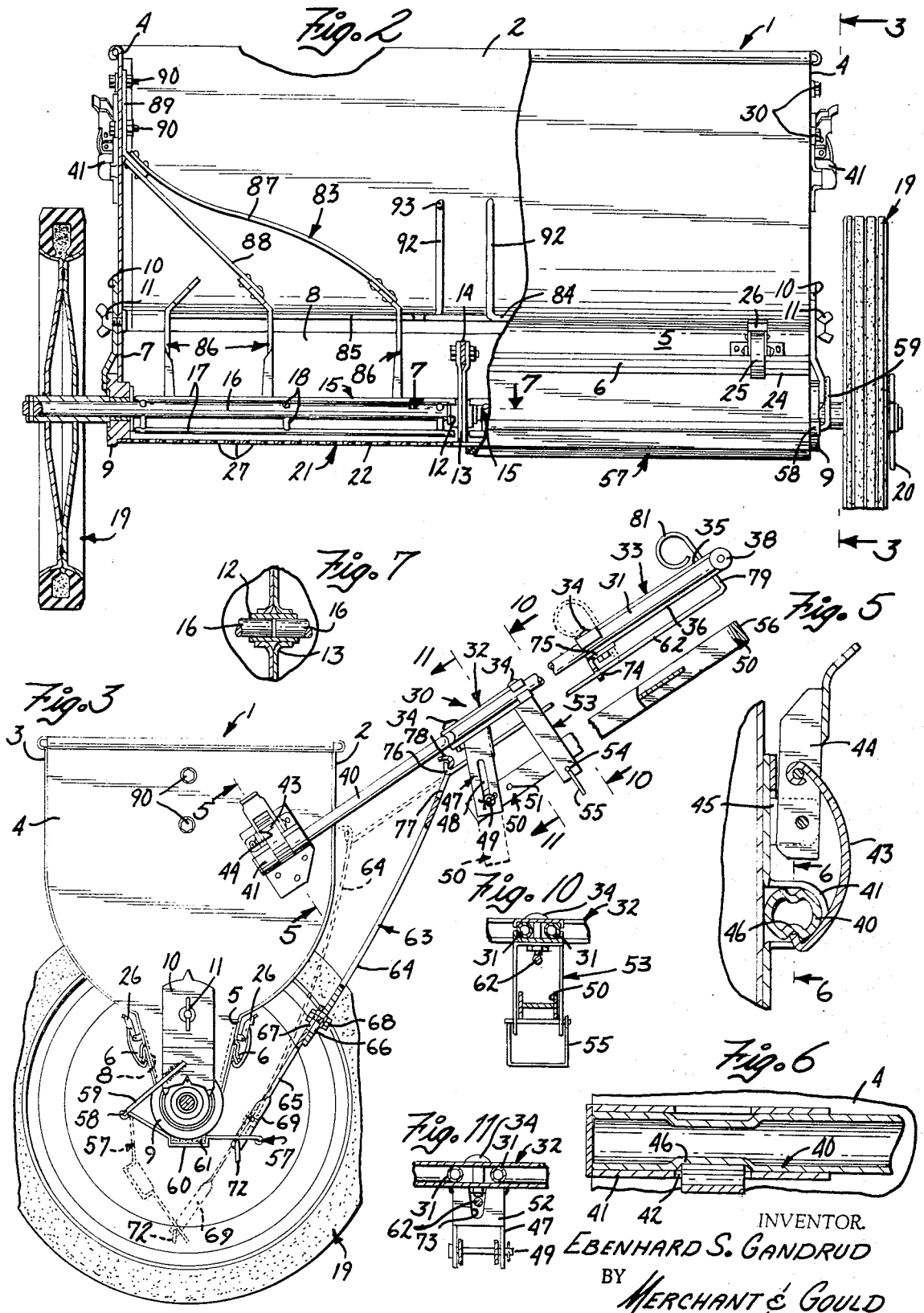

GRANULAR APPLICATOR FOR LAWNS

SUMMARY OF THE INVENTION

An important object of this invention is the provision of an applicator having a fixed rate of delivery of material to the ground, and of means whereby such delivery of material can be easily and completely turned on or shut off.

Another object of this invention is the provision of an applicator which can be easily cleaned after use and which can be partially dismantled for storage with a minimum of effort and time delay, and as easily and quickly reassembled for use.

Still another object of this invention is the provision of an applicator as set forth which, when dismantled, will occupy a minimum of storage space.

To the above and further ends, I provide a hopper having side and end walls, the side walls having downwardly converging lower portions defining a longitudinal bottom opening, shaft equipped rotor means extending longitudinally of the opening and journaled in bearings on the end walls, a hopper bottom member having a cross-sectionally arcuate bottom portion underlying the rotor means, and discharge apertures in the bottom portion, and means at the opposite sides of the hopper, including a latch, for releasably locking the bottom member to the hopper. Supporting wheels are mounted on the rotor means adjacent the opposite end walls for imparting rotation to the rotor responsive to movement of the hopper over the ground. A combination spreader and closure plate extends longitudinally of the bottom member and is mounted on the hopper for pivotal movements between an aperture closing position underlying the bottom member and a spreading position adjacent one side of the apertures. An actuator, and a link connecting the actuator to the spreader and closure plate, operate to move the plate between its said positions and hold the plate in said positions. An elongated shank projects laterally from the hopper whereby the applicator may be pushed or pulled over the ground, and means is provided for quickly attaching or detaching the shank from the hopper.

DESCRIPTION OF THE DRAWINGS

FIG. 1 is a view in top plan of a granular applicator produced in accordance with this invention, some parts being broken away;

FIG. 2 is a view partly in longitudinal section and partly in side elevation, some parts being broken away;

FIG. 3 is a view partly in end elevation and partly in section, taken substantially on the line 3—3 of FIG. 2, some parts being broken away and some parts being shown in section;

FIG. 4 is an enlarged fragmentary section taken substantially on the line 4—4 of FIG. 1;

FIG. 5 is an enlarged fragmentary section taken on the line 5—5 of FIG. 3;

FIG. 6 is an enlarged fragmentary section taken on the line 6—6 of FIG. 3;

FIG. 7 is a fragmentary section taken on the line 7—7 of FIG. 2;

FIGS. 8 and 9 are views in bottom plan of a pair of interchangeable hopper bottom members of this invention; and FIGS. 10 and 11 are fragmentary details in section, taken on the lines 10—10 and 11—11 respectively of FIG. 3.

DETAILED DESCRIPTION OF PREFERRED EMBODIMENT

A generally rectangular open topped hopper 1, is shown as comprising opposite side walls 2 and 3, and generally vertical end walls 4, the side walls 2 and 3 having downwardly converging lower side wall portions 5, see particularly FIG. 3. The lower converging side wall portions 5 terminate in generally outwardly and downwardly projecting lips 6 above the level of the lower ends 7 of the end walls 4. Laterally inwardly of the lips 6, the hopper 1 is provided with a pair of flat skirt portions 8 that extend longitudinally from one end wall 4 to the other thereof, the skirt portions 8 being welded or otherwise rigidly secured to the inner surfaces of the converging side wall portions 5, see particularly FIGS. 3 and 4.

A pair of aligned bearing members 9 are each mounted on on the lower end of a different one of the end walls 4 by means of clamping members or clips 10 and wing nut-equipped clamping screws 11, see particularly FIGS. 2 and 3. An intermediate bearing 12, aligned with the bearing members 9 and disposed generally centrally between the bearing members 9, is mounted in a bracket 13 secured to a transverse bar or the like 14 rigidly secured at its opposite ends to the skirt portions 8. Rotor means in the nature of a pair of identical axially aligned rotors 15 are disposed in the bottom portion of the hopper 1, each rotor 15 comprising an axial shaft 16 and a plurality of circumferentially spaced longitudinal rotor or feeder bars 17 secured to their respective rotor shafts 16 by means of radial legs or the like 18. The inner ends of the rotor shafts 16 are journaled in the central bearing 12 in substantially abutting relationship, see FIG. 7, the outer end portions of the shafts 16 each being journaled in a different one of the bearings 9. A pair of tire-equipped ground engaging wheels 19 are mounted on the outer ends of the shafts 16 outwardly of the end walls 14, and are releasably locked on their respective shafts 16 by means of cotter pins 20. Thus, each rotor 15 is independently driven by its respective wheel 19 when the applicator is moved over the ground.

An elongated cross-sectionally generally U-shaped hopper bottom member 21 has a cross-sectionally arcuate bottom portion 22 which closely underlies the bottoms of the rotors 15, and upwardly diverging side walls 23 the upper edges of which are bent outwardly and downwardly to provide flanges 24, see particularly FIG. 4. As there shown, the upper edges of the hopper bottom member 21 are adapted to be received between the lips 6 and adjacent portions of the skirts 8. A plurality of resilient latch hooks 25 are disposed at opposite sides of the hopper 1 outwardly of the lips 6 and are connected to latch operating elements 26 pivotally mounted on the side wall portion 5 to releasably lock the hopper bottom member 21 in place. As shown in FIGS. 4 and 8, the hopper bottom member 21 is provided with a plurality of longitudinally spaced discharge apertures 27 of predetermined size and which underlie the rotors 15. A modified form of hopper bottom member is illustrated in FIG. 9 and designated by the reference numeral 28, the same having a pair of elongated slots 29 therein for discharge of material therethrough. The hopper bottom member 28 is adapted to be interchangeable with the hopper bottom member 21 when it is desired to spread granular material at a different rate than that which occurs when using the hopper bottom number 21. It will be appreciated that hopper bottom members can be supplied with several discharge aperture arrangements for application of different granular materials to the ground, it being a simple matter to remove one hopper bottom member and substitute another therefor.

For the purpose of moving the applicator over a lawn or the ground, I provide a shank 30 comprising a pair of elongated tubular members 31 that extend laterally outwardly from the side of the hopper 1 and are held in closely spaced generally parallel relationship by inner and outer clamping plates 32 and 33 and nut-equipped clamping screws 34. The clamping plates 32 are two in number, being disposed above and below the rods 31, the clamping plate 33 being bent to provide upper and lower portions 35 and 36 respectively. Within the clamping member 33, the tubular members 31 are bent laterally away from each other to form handle portions 37 having hand grips 38 thereon, see particularly FIGS. 1 and 3. The tubular members 31 are formed to provide a pair of arms 39 that project in opposite directions generally laterally of the shank 30, each of the arms 39 being bent to provide one of a pair of laterally spaced parallel finger elements 40 disposed adjacent opposite end walls 4 of the hopper 1. A pair of finger receiving socket elements 41 are rivetted or otherwise rigidly secured one each to an opposite end wall 4 for reception of the finger elements 40 of the shank 30. The socket elements 41 have openings 42 therein for reception of resilient latch hooks 43 similar to the latch hooks 25, the latch hooks 43 being pivotally secured to latch hook operating handles 44 similar to the hook operating elements 26, and pivotally secured to the hopper end walls 4 by means of mounting brackets or the like 45. Each of the finger elements 40 is provided with an indented portion 46 that is adapted to register with the opening 42 in its respective socket element 41 when the finger elements 40 are properly received in their respective socket elements 41, for reception of the latch hooks 43, as shown in FIGS. 5 and 6. When the latch hooks 43 are received in the recesses defined by the indentations 46 the shank 30 is securely locked in place relative to the hopper 1, sloping laterally outwardly and upwardly therefrom.

A bifurcated bracket 47 is welded to the lower one of the clamping plates 32 and extends downwardly therefrom, the same being provided with aligned slots 48 through which extend a cotter pin equipped pivot shaft 49 for pivotal mounting of a supporting leg 50. As shown in FIG. 3, the leg 50 is provided with a pair of longitudinally spaced transverse apertures 51, the shaft 49 extending through a selected one of the apertures 51 whereby the supporting leg 50 maybe swung between a supporting position shown by dotted lines in FIG. 3, and an inoperative storage position shown by full lines in FIG. 3. In its dotted line supporting position of FIG. 3, the upper end portion of the leg 50 engages a wall portion 52 of the bracket 47 to limit pivotal movement of the leg 50 in one direction. A bifurcated support bracket 53 depends from the lower one of the clamping plates 32 and is adapted to receive therein the supporting leg 50 when the same is moved to its full line storage position of FIG. 3. The support bracket 53 is provided with aligned openings 54 for reception of a retaining pin or clip 55 for supporting the leg 50 in its storage position. Although specifically not shown, it will be appreciated that the free end 56 of the leg 50 is adapted to engage the ground when the leg 50 is moved to its dotted line operative position of FIG. 3, to support the hopper 1 in a generally vertical position. It will be noted that, in the dotted line supporting position of the leg 50, the same may be disposed so that the pivot shaft 49 is located at or near the upper end of the slots 48. With the leg 50 thus positioned, engagement thereof with the wall portion 52 of the bracket 47 will hold the leg 50 against pivotal movement in either direction about the axis of the pivot shaft 49.

For the purpose of closing the discharge openings 27, an elongated combination spreader and closure plate 57 is provided, the same extending longitudinally of the hopper 1 and pivotally mounted along one longitudinal edge on shaft means 58 extending parallel to the axis of the rotors 15 and having angular disposed end portions 59 that are welded or otherwise rigidly secured to the bearing clips 10. The plate 57 is formed to provide an upwardly opening channel portion 60 that extends longitudinally of the hopper 1, and which contains a pad or gasket element 61 that is adapted to engage the bottom portion 22 of the member 21 to close the discharge openings 27, as shown in FIGS. 3 and 4. As shown in particularly in FIG. 3, the plate 57 is pivotally movable on the axis of the shaft means 58 between its closure forming position shown in full lines and a material spreading position adjacent one side of the discharge openings 27 and as shown by dotted lines in FIG. 3. Means for moving the plate 57 between these positions comprises an actuator member 62 and a tie member 63, the tie member 63 comprising a pair of tie member sections 64 and 65 having adjacent ends provided with longitudinally extending slots 66 and 67 respectively and releasably locked together by a nut-equipped clamping screw 68 extending through the aligned slots 66 and 67, see particularly FIG. 3. The tie member section 65 has a lower end portion 69 that extends through a slot 70 in the plate 57, the end portion 69 being provided with a pair of longitudinally spaced transverse openings 71 through a selected one of which extends a pin or clip 72 that engages the plate 57, see particularly FIG. 3 and 4.

The actuator 62 is in the nature of an elongated rod disposed in underlying parallel relationship to the shank 30 and extending through a slot 73 in the wall 52 of the bracket 47, and through an opening 74 in an angle bracket 75 secured to the lower portion 36 of the clamping plate 33 by the screw 34 thereof. The actuator 62 has its inner end back-turned to provide a hook 76 that extends through a longitudinal slot 77 in the upper end portion of the tie member section 64, the hook 76 engaging a cooperating hook portion 78 formed in the extreme upper end of the tie member 64. The actuator 62 is further formed to provide an upturned outer end portion 79 that projects upwardly through alighed slots 80 in the upper and lower portions 35 and 36 of the clamping plate 33, the slots extending parallel to the longitudinal axis of the actuator 62 and to the shank 30, one of the slots 80 being shown in FIG. 1. The extreme outer end of the actuator 62 is formed to provide a handle portion 81. As shown in FIG. 3, movement of the actuator 62 longitudinally of the shank 30 and toward the hopper 1 permits the plate 57 to be pivotally moved downwardly toward its dotted line material spreading position; movement of the actuator 62 in the opposite direction raising the plate 57 into closing relationship with the bottom portion of the hopper bottom member 21. When the actuator 62 is moved to its outermost position wherein the plate 57 closes the discharge opening in the hopper bottom, the upwardly projecting portion 79 of the actuator may be moved laterally into a pair of angularly displaced slot portions 82 in the clamping plate 33 to lock the plate 57 in its closure forming position. One of the slot portions 82 is shown in FIG. 1.

Although not specifically shown, it will be appreciated that, when it is desired that the shank 30 and parts carried thereby be disconnected from the hopper 1, the hook 76 may be disengaged from the hook portion 78, after which the hook 78 may be hooked over the upper edge of the hopper side wall 2 to hold the plate 57 against the bottom surface of the hopper bottom member 21. The tie member sections 64 and 65 are preferably made from strap metal having sufficient flexibility to enable the same to be bent so that the hook 78 will engage the upper edge of the hopper side wall 2.

For the purpose of preventing bridging of granular material in the hopper 1 during dispensing of the material to the ground, and promoting uniform feeding of the material to the feeding rotors 15 and discharge openings 27, I provide a pair of agitators 83 each disposed in the hopper in a overlying relationship to a different one of the rotors 15. The agitators 83 are identical, each comprising a pair of laterally spaced generally horizontal rod elements 84 and 85, a plurality of generally vertical plate-like members 86 rigidly secured to the rod elements 84 and 85, a pair of elongated resilient mounting arms 87 and 88 each having a lower end rigidly secured to a different one of the plate-like members 86 and an upper end secured to a mounting bracket 89 secured to an adjacent one of the hopper end walls 4 by nut-equipped screws or the like 90. Each of the plate like members 86 has a rounded bottom portion 91 that is adapted to rest upon an underlying one of the rotor shafts 16 and to be engaged by the feeder bars 17 during rotation of the rotors 15. This engagement of the bottom portions 91 by bars 17 imparts upward movement to the respective agitators 83 against bias of gravity and the resilient mounting arms or springs 87 and 88, so that, during rotation of the rotors 15, the agitators 83 partake of continuous upward and downward jiggling movement. Preferably, the rod elements 84 and 85 are disposed in common horizontal planes for the greater part of their length, the rod elements 84 having angularly displaced portions 92 that extend vertically upwardly and horizontally disposed inner end portions 93 extending in opposite directions transversely of the hopper 1 at a level substantially above that of said common horizontal plane. The above-mentioned upward and downward jiggling movement imparted to the agitators 83 by the feeder bars 17 is fairly rapid, and sets up sufficient vibration in the hopper 1 to prevent material in the hopper from adhering to the side and end walls thereof.

The above-described structure permits quick and easy assembly and disassembly of the several parts comprising the applicator. When it is desired to remove the replace the hopper bottom member 21, it is only necessary to swing the combination spreader and closure plate to its open spreader position and thereafter unlatch the hooks 25. The wheels 19 may be slipped off from their respective rotor shafts 16 when the cotter pins or clips 20 are removed. By loosening the wing nuts 11, the clips 10 may be disengaged from the bearing 9, after which the bearings 9 and rotors 15 may be withdrawn from the hopper 1. The shank 30 is removed from the hopper 1 by merely unlatching the hooks 43 and pulling the finger elements out of engagement with their respective socket elements 41. Thus, the entire structure may be packaged in a carton only slightly larger than the hopper 1, for storage or shipment, and quickly and easily assembled for use when desired.

The chemical applicator of this invention has been thoroughly tested and found to be completely satisfactory for the accomplishment of the objectives set forth; and, while I have shown and described a commercial embodiment of chemical applicator, it will be understood that the same is capable of modification without departure from the spirit and scope of the invention, as defined in the claims.

I claim:

1. A granular chemical applicator comprising:
   a. an elongated hopper including generally vertical end walls and laterally spaced side walls having downwardly converging lower side portions defining opposite sides of a bottom opening extending longitudinally between said end walls;
   b. a pair of aligned bearings mounted one each on a different one of said end walls;
   c. rotor means including axial rotor shaft means journaled in said bearings and extending longitudinally of said opening;
   d. ground engaging drive wheels mounted on said rotor shaft means adjacent said end walls for common rotation with the rotor shaft means;
   e. a hopper bottom member extending between said end walls adjacent said rotor means, said hopper bottom member having a cross-sectionally arcuate bottom underlying said rotor means and defining discharge aperture means of predetermined size for flow of granular material therethrough;
   f. means at opposite sides of the hopper including a latch for releasably locking said hopper bottom member on said hopper;
   g. means whereby movement may be imparted to said hopper over the ground and including a shank projecting laterally outwardly with respect to one of said side walls;
   h. means for releasably mounting said shank on said hopper;
   i. a combination spreader and closure plate extending longitudinally of said bottom member and mounted for pivotal movements toward and away from underlying operative engagement with the bottom of said bottom member whereby to selectively open and close said discharge aperture means;
   j. and connections including an actuator member and an elongated tie member connected to said actuator member and said spreader and closure plate for moving said plate toward and away from underlying engagement with the bottom of said bottom member.

2. The applicator defined in claim 1 in which said means for releasably mounting the shank on said hopper comprises a pair of arms projecting in opposite directions laterally of said shank, a pair of finger elements and a pair of finger receiving socket elements, one pair of said elements being mounted on said hopper, said arms having end portions defining the outer pair of said elements.

3. The applicator defined in claim 2 in which said shank comprises a pair of rod members disposed in side-by-side generally parallel relationship and having portions bent laterally to provide said arms.

4. The applicator defined in claim 3 in which said rod members have outer end portions bent laterally in opposite directions to provide handles.

5. The applicator defined in claim 2 in which said socket elements are mounted on said hopper, characterized by a pair of latch elements one each mounted on the hopper adjacent a different one of said socket elements, said end portions of the arms defining said finger elements, said finger elements having portions engaged by said latch elements to releasably lock said finger elements in their respective socket elements.

6. The applicator defined in claim 1 in which said actuator member and tie member have interengaging end portions releasably connected together for common movements of said actuator member and tie member, said end portion of the tie member being engageable with said hopper, when released from said actuator member, to hold said spreader and closure plate against the hopper bottom element.

7. The applicator defined in claim 6 in which said interengaging end portions comprise cooperating hooks, the hook on said tie member being disposed to engage the upper edge of one of said side walls when detached from said actuator member.

8. The applicator defined in claim 1 in which said spreader and closure plate defines a channel extending longitudinally with respect to said hopper bottom member, characterized by a gasket element substantially filling said channel and engaging the bottom surface of said hopper bottom member and clsoing the discharge aperture means therein when said plate is moved into operative engagement with said hopper bottom member.

9. The applicator defined in claim 1 in which said rotor means comprises a pair of axially aligned rotors, said rotor shaft means including a pair of axially aligned shaft members one for each of said rotors, each of said wheels being secured to the outer end of a different one of said shaft members to impart rotation to its respective shaft member independently of the other thereof, said shaft members having inner ends in substantially abutting relationship, characterized by bearing means journaled said inner ends in said hopper.

10. The applicator defined in claim 1 in which said rotor means includes an elongated rotor element having circumferentially spaced radially inner and outer portions, characterized by an agitator element secured within said hopper and disposed above said rotor element, said agitator element having a portion engaging said inner and outer portions alternately of said rotor element for reciprocatory agitating movements responsive to rotation of said rotor means.

11. The applicator defined in claim 10 in which said agitator element includes an elongated resilient arm extending generally longitudinally of said hopper, said resilient arm being secured at one end to an adjacent one of said hopper end walls, said rotor element engaging portion of the agitator projecting downwardly from the other end of said resilient arm, said resilient arm being yiedlingly urged into engagement of the rotor engaging portion thereof with said rotor element portions.

* * * * *